(12) United States Patent
Dagard

(10) Patent No.: US 6,912,263 B2
(45) Date of Patent: Jun. 28, 2005

(54) METHOD AND DEVICE FOR FEEDING AT LEAST ONE STEAM GENERATOR OF A PRESSURIZED-WATER NUCLEAR REACTOR DURING PERIODS OF REACTOR SHUTDOWN

(75) Inventor: Philippe Dagard, Marly le Roi (FR)

(73) Assignee: Framatome ANP, Courbevoie (FR)

(*) Notice: Subject to any disclaimer, the term of this patent is extended or adjusted under 35 U.S.C. 154(b) by 0 days.

(21) Appl. No.: 10/201,079

(22) Filed: Jul. 24, 2002

(65) Prior Publication Data

US 2003/0072403 A1 Apr. 17, 2003

(30) Foreign Application Priority Data

Jul. 24, 2001 (FR) .......................................... 01 09872

(51) Int. Cl.⁷ .............................................. G21C 9/00
(52) U.S. Cl. ........................ 376/299; 376/298; 60/677
(58) Field of Search ............................. 376/299, 260, 376/283, 282, 298, 407; 60/677

(56) References Cited

U.S. PATENT DOCUMENTS

| | | | |
|---|---|---|---|
| 1,353,457 A | | 9/1920 | Crosthwait, Jr. |
| 4,444,246 A | * | 4/1984 | Reinsch ................. 165/104.22 |
| 4,473,528 A | * | 9/1984 | Kleimola .................... 376/282 |
| 4,687,626 A | | 8/1987 | Tong |
| 5,257,296 A | | 10/1993 | Buford, III et al. |
| 5,262,091 A | * | 11/1993 | Narabayashi et al. ......... 261/21 |
| 5,661,769 A | * | 8/1997 | Mansani et al. ............ 376/283 |
| 5,896,435 A | * | 4/1999 | Gautier et al. .............. 376/407 |
| 6,109,037 A | * | 8/2000 | Kumagai et al. ............. 60/677 |
| 2002/0162518 A1 | * | 11/2002 | Dumaz et al. ............... 122/404 |

FOREIGN PATENT DOCUMENTS

| | | |
|---|---|---|
| DE | 3005643 | 8/1981 |
| DE | 3115344 | 11/1982 |
| EP | 0798469 | 10/1997 |
| FR | 2433365 | 3/1980 |
| RU | 2037893 | 6/1995 |

OTHER PUBLICATIONS

France Search Report, FA 607617, FR 0109872, Feb. 27, 2002, pp. 1–2.

* cited by examiner

Primary Examiner—Michael J. Carone
Assistant Examiner—Rick Palabrica
(74) Attorney, Agent, or Firm—Connolly Bove Lodge & Hutz LLP

(57) ABSTRACT

At least one injector condenser (20) is used to supply secondary feedwater to the steam generator (1) during a phase in the course of which the temperature and the pressure of the coolant of the reactor coolant system (2) of the nuclear reactor are varied between hot shutdown conditions of the nuclear reactor and conditions making it possible to bring into service the residual heat cooling system (RRA). The injector condenser (20) is fed with steam withdrawn from an upper part of the steam generator (1), at a first inlet, and with feedwater from a storage tank (10), at a second inlet. High-temperature pressurized feedwater is supplied to the steam generator (1) by means of one injector condenser (20) outlet. The steam generator (1) is fed without using an additional pump for withdrawing feedwater from the storage tank (10) and for injecting feedwater into the secondary part (3) of the steam generator (1).

3 Claims, 4 Drawing Sheets

METHOD AND DEVICE FOR FEEDING AT LEAST ONE STEAM GENERATOR OF A PRESSURIZED-WATER NUCLEAR REACTOR DURING PERIODS OF REACTOR SHUTDOWN

FIELD OF THE INVENTION

The invention relates to a method for feeding a steam generator of a pressurized-water nuclear reactor with secondary feedwater, in the course of a phase during which the temperature and the pressure in the nuclear reactor are varied between hot shutdown conditions of the nuclear reactor and conditions making it possible to start up a reactor residual heat cooling system, called the RRA system.

BACKGROUND OF THE INVENTION

Pressurized-water nuclear reactors comprise a reactor coolant system in which coolant for cooling the core of the nuclear reactor flows and in which at least one steam generator is placed, providing heat exchange between the coolant of the nuclear reactor, or reactor coolant, and feedwater or secondary feedwater which is heated and vaporized inside the steam generator by heat exchange with the reactor coolant.

At the time of bringing the nuclear reactor into service, feedwater is withdrawn from a storage tank and introduced into the secondary part of the steam generator.

During operation of the nuclear reactor, the feedwater introduced into the secondary part of the steam generator is heated and vaporized; the steam is recovered and dried in the upper part of the steam generators, then sent to the turbine associated with the nuclear reactor.

The steam used to operate the turbine is then recovered in a condenser and the water formed in the condenser is reheated and sent back into a feedwater storage tank, from which it is withdrawn in order to feed the steam generator.

The feedwater of the steam generator is withdrawn from the storage tank by pumps and reheated and pressurized before being injected back into the secondary part of the steam generator.

After a certain time of operation of the nuclear reactor, it is necessary to carry out an operation of refuelling the core of the nuclear reactor, in the course of which the fuel assemblies are changed inside the core and some spent assemblies, whose burn-up rate has reached the limit set by the conditions for operating the nuclear reactor, are replaced.

In order to refuel the core of the nuclear reactor, it is necessary to completely shut down the reactor and to depressurize and cool the reactor coolant system, down to a temperature which makes it possible to open the vessel head in order to access the nuclear reactor core inside the vessel, from a pit into which the nuclear reactor vessel emerges.

In order to shut down and cool the nuclear reactor to a temperature allowing the inside of the vessel to be accessed, this nuclear reactor shutdown being called a cold shutdown, the nuclear reactor is firstly shut down by dropping all the control rods into the core of the reactor in order to obtain conditions characterizing hot shutdown of the nuclear reactor.

The hot shutdown of the nuclear reactor allows the temperature in the reactor coolant system to go from temperatures characteristic of the operating reactor (300° C. to 320° C.) down to a uniform temperature characterizing hot shutdown (about 296° C.); the pressure in the reactor coolant system is kept at a constant value (about 155 bar); the power released by the core, or the residual power of the reactor, is then less than 2% of the nominal power. The temperature in the secondary part of the steam generator goes from a value of about 290° C. down to an equilibrium temperature with the reactor coolant system (296° C.), the pressure remaining substantially constant and equal to 83 bar.

In order to carry out a cold shutdown of the nuclear reactor, a cooling system, called the reactor residual heat cooling system or RRA system, is used.

The RRA system can only be brought into service when the pressure and the temperature in the reactor coolant system have reached levels substantially lower than the temperature and pressure levels of a hot shutdown. Generally, the RRA system can only be brought into service after the reactor coolant system has been cooled down to 180° C. at least, the pressure in the reactor coolant system having been reduced down to at least 30 bar. Under startup conditions of the RRA system, the secondary cooling system is in temperature equilibrium with the reactor coolant system (180° C.) and the pressure is no more than about 10 bar.

In order to go down from temperature and pressure conditions of hot shutdown to the conditions allowing the RRA system to be started up, a steam generator auxiliary feedwater system, called an ASG system, is used in a conventional manner. Feedwater is withdrawn from a storage tank of the ASG system and injected into the steam generator via a normal feedwater pipe connected to a nozzle of the steam generator. Water from the ASG system is at low temperature (between about 7° C. and 50° C.) and the injection of water by means of a tap, in the feedwater pipe of the steam generator, causes thermal shock which could lead, with repetition, to thermal fatigue of the injection line and of the nozzles of the steam generator.

This is because water from the ASG system is introduced into the injection line of the steam generator by successive manually controlled jets. Use of the ASG system is generally characterized by a wear factor which is equal to the ratio of the number of unit jets of cold water injected into the generator to the maximum acceptable number of injections. The wear factor must be as small as possible, which restricts the use of the ASG system.

The ASG system is also used during re-startup of the nuclear reactor, from conditions for bringing into service the RRA system up to conditions characterizing hot shutdown, in order to carry out injections of secondary feedwater needed to keep the level in the steam generator substantially constant.

In addition to thermal fatigue of the injection line of the steam generator nozzle produced by injection of cold water, use of the ASG system has the drawback of bringing into service an emergency system of the nuclear reactor, in the context of normal operation of the nuclear reactor.

BRIEF DESCRIPTION OF THE INVENTION

The aim of the invention is therefore to provide a method for feeding a steam generator of a pressurized-water nuclear reactor with secondary feedwater, the nuclear reactor comprising a reactor coolant system in which reactor coolant for cooling the core of the nuclear reactor flows, heating the feedwater, in the steam generator, by means of heat exchange, during a phase in the course of which the temperature and the pressure of the coolant are varied between hot shutdown conditions of the nuclear reactor and conditions making it possible to start up a system for cooling the shut down reactor, this method making it possible to decrease the costs of construction, installation and maintenance together with the size of the means of feeding the steam generator and of improving the reliability of feeding the steam generator and means used for this feed.

With this aim, the steam generator is fed by using at least one injector condenser, at least one first inlet of which is fed with steam and a second inlet of which is fed with steam generator feedwater, the steam generator feedwater being supplied under pressure and at high temperature to the steam generator, from an outlet of the injector condenser.

The invention also relates to a feed device allowing the method according to the invention to be implemented.

In order for the invention to be better understood, the implementation of the method according to the invention and the means associated with the nuclear reactor system for implementing this method will now be described by way of example, with reference to the appended figures.

DETAILED DESCRIPTION OF THE INVENTION

Figure 1A:
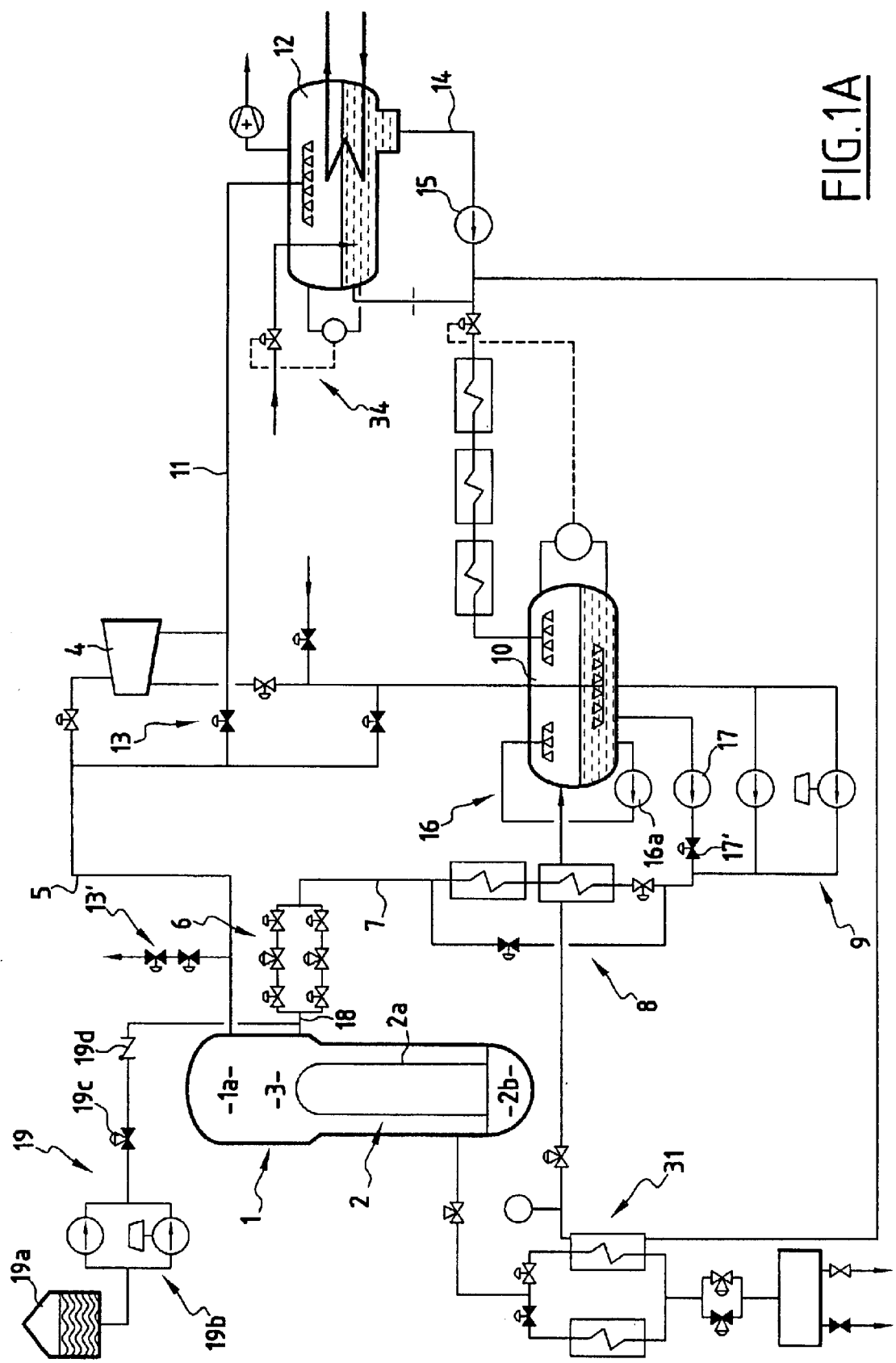
FIG. 1A is a diagram showing the steam generator feedwater systems of a pressurized-water nuclear reactor, according to the prior art.

FIG. 1A shows a steam generator 1 of a pressurized-water nuclear reactor, the primary part 2 of which comprises a bundle of heat exchange tubes 2a and a channel head 2b.

The channel head 2b comprises two compartments which are each connected to a pipe of a reactor coolant system of the nuclear reactor making it possible for the pressurized coolant to flow in contact with the nuclear reactor core located inside a vessel.

The secondary part 3 of the steam generator is placed inside the external envelope of the steam generator, above the channel head 2b and around the bundle of exchange tubes 2a, so that the secondary feedwater introduced into the envelope of the steam generator can be heated and vaporized on contact with the tubes of the tube bundle 2a, in which the reactor coolant of the nuclear reactor flows.

Steam is recovered in the upper part 1a of the envelope of the steam generator 1 and sent to the turbine 4 of the steam generator by means of a steam pipe 5.

The secondary feedwater of the steam generator is introduced into the envelope of the steam generator 1 by means of a tap 18, at a level located substantially in the upper part of the bundle 2a, in an annular space surrounding the bundle 2a.

The secondary feedwater is introduced into the steam generator by means of a normal feedwater system 6 of the steam generator (called the ARE system).

The ARE feedwater system of the secondary part 3 of the steam generator comprises pipes placed in parallel one with respect to the other, on which motor-operated valves and control valves are mounted.

The ARE system is connected, via a pipe 7, a high-pressure heating system 8 (AHP system) and two turbine-driven feedwater pumps 9 placed in parallel, to a steam generator feedwater tank 10 in which the level of feedwater is regulated.

The set of feedwater pumps 9 may in particular comprise two normal steam generator turbine-driven feedwater pumps and an auxiliary steam generator feedwater pump, called an APD pump, which is used in the intermediate phases between hot shutdown of the nuclear reactor and startup of a cooling system for cold shutdown (RRA).

The steam recovered at the outlet of the turbine 4 or withdrawn directly from the steam pipe 5 by means of a bypass valve 13 is sent to the condenser 12 which is cooled so as to condense the steam. The recovered water is sent back to the feedwater storage tank 10, via a pipe 14 on which an extraction pump 15 (CEX pump) and a low-pressure feedwater heater system (ABP) is placed.

Some of the steam withdrawn from the steam pipe 15 or at the inlet of the turbine 4 may also be sent inside the storage tank 10 for reheating and degassing the feedwater.

A feedwater recirculation system 16, comprising a circulation pump 16a, makes it possible to circulate the feedwater of the tank 10 in a closed system.

The various means of heating, feeding and withdrawing secondary feedwater from the storage tank 10 are regulated such that the water in the tank 10 is at a temperature less than 130° C. and at a pressure of about 2.5 bar during hot shutdown. The tank 10 is placed at a level located substantially above (change in elevation of 20 m) the means of injecting water into the steam generator, such that the feedwater is supplied at a pressure substantially greater than 2.5 bar (for example 6 bar).

After shutdown of the nuclear reactor, for example a programmed shutdown, obtained by dropping control rods into the position of maximum insertion in the core of the nuclear reactor, the reactor coolant system must be cooled and depressurized.

In order to vary the temperatures and pressures in the reactor coolant system and, in particular, in the primary part 2a–2b of the steam generator, from hot shutdown conditions to conditions allowing the reactor residual heat cooling system (RRA) to be brought into operation (temperature of about 180° C. and pressure of about 10 bar, in the steam generator), it is possible to use the pump 17 of the APD system to feed the secondary part of the steam generator with feedwater at a desired temperature, pressure and flow rate.

In order to cool the reactor coolant system, the steam generators are provided with a large stream of secondary water to remove heat from the reactor coolant system. The feedwater flow rate is regulated by adjusting motor-operated valves 17' of the APD system and valves 6 of the ARE system to a low flow rate.

In order for the reactor coolant system and the steam generator to go from the operating conditions of the RRA system to hot shutdown conditions, for example prior to starting up the nuclear reactor again, coolant is circulated in the reactor coolant system using pumps of the nuclear reactor coolant system, this circulation causing heating of the reactor coolant and release of heat, and the secondary part of the steam generator is fed with a low secondary feedwater flow rate, such that the temperature of the reactor coolant system can increase up to hot shutdown conditions. The steam generator is fed with reactor coolant by the APD pump 17, at a low flow rate which may be controlled by the motor-operated valve 17' in order to maintain the level in the steam generator.

The devices used in the prior art comprising the APD system have various drawbacks.

The APD system comprises at least one motor-driven pump which must be able to feed the steam generators of the nuclear reactor under hot shutdown conditions; the secondary part of the steam generators then contains water at a temperature of about 296° C., and a pressure of about 83 bar. The water injected into the nozzles of the steam generators, which is withdrawn from the feedwater tank 10, is at a temperature at the most equal to 130° C. and must be injected with a maximum flow rate of about 260 m³/h, for a reactor of the 1300 MWe four-loop type.

In order to do this, an APD motor-driven pump, whose electric drive motor is supplied at a voltage of 6600 volts, is used. The flow rate is regulated by means of a control valve 17' placed downstream of the motor-driven pump 17. Valves of the ARE system are also used to regulate small flow rates.

The APD pump comprises a part rotating with several stages which requires bearings and sealing linings. The operational reliability of the pump may be reduced because these bearings and linings are capable of deteriorating in service. The cost and size of the pumps of the APD system may in addition be considerable.

Furthermore, the secondary feedwater injected into the nozzles of the steam generators is at a temperature of about 110° C., taking account of energy losses, which is substantially less than the temperature in the secondary part of the steam generator. The result of this may be thermal fatigue of the nozzles of the steam generators and associated taps which are at a temperature close to that of the steam generator.

Figure 1B:
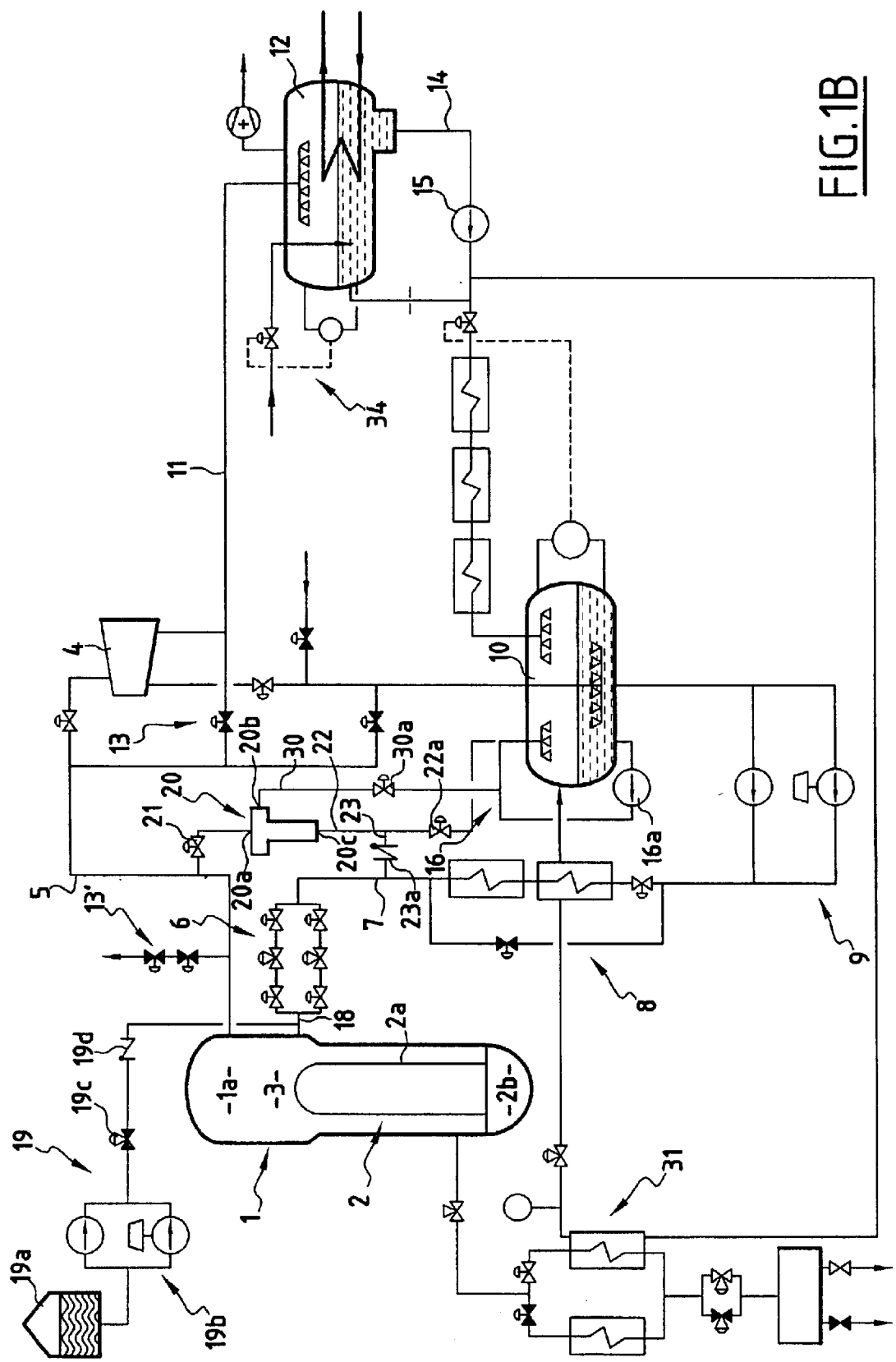
FIG. 1B is a diagram showing the steam generator feedwater systems of a pressurized-water nuclear reactor and associated means for implementing the method according to the invention.

The method according to the invention uses at least one injector condenser 20 placed on the steam generator feedwater system, as shown in FIG. 1B, in order to inject feedwater into the steam generators of the nuclear reactor, so that the hot shutdown temperature and pressure conditions in the reactor coolant system can go down to the conditions allowing the RRA system to be brought into service.

An injector condenser is a passive heat compression apparatus, which does not contain any rotating movable parts, unlike a pump. A flow of steam introduced into the injector condenser by at least one first inlet makes it possible to suck up water which is introduced into the injector condenser by a second inlet and which is mixed with steam. At the outlet of the injector condenser, the stream is completely liquid.

The injector condenser has the shape of a Laval (convergent-divergent) nozzle. The steam flows in the injector condenser at a speed which becomes supersonic from the neck of the nozzle. Part of the enthalpy of the steam is converted into kinetic energy and allows the water to be driven. The steam condenses on transmitting its kinetic energy to the water, via a condensation wave downstream of the nozzle neck. The pressure of the water-steam mixture in the diffuser may be greater than the inlet pressures of the steam and of the water.

The injection condenser has an operation of the volumetric type and allows a liquid such as water to be discharged at a constant flow rate whatever the cooling pressure, up to a maximum pressure value.

Where at least one injector condenser 20 is used to feed at least one steam generator 1 of a pressurized-water nuclear reactor, as shown in FIG. 1, the injector condenser 20 is fed with steam by at least one first inlet, from a steam generator, via the steam pipe 5 connected to a withdrawal pipe on which a stop valve 21 is placed. Water is sucked in the storage tank 10 and introduced into the injector condenser 20, by means of a second inlet.

The outlet of the injector condenser 20 is connected, by a pipe 23 on which a check valve 23a is placed, to the pipe 7 for feeding the steam generator with secondary feedwater.

Figure 2:
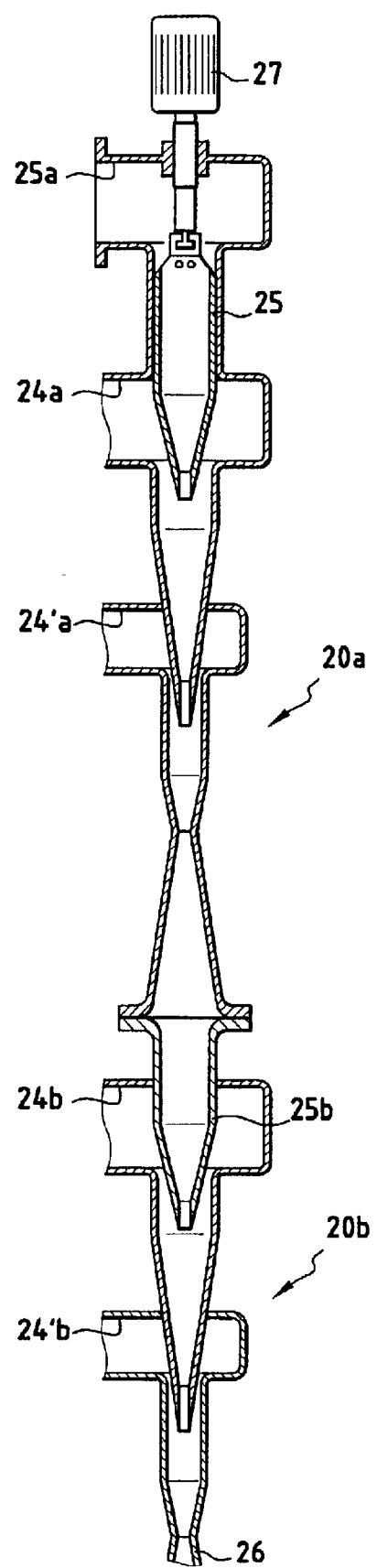
FIG. 2 is a view in section of an injector condenser used for implementing the method according to the invention.

Preferably, for the implementation of the invention, at least one injector condenser with two stages, as shown in FIG. 2, is used.

The two stages 20a and 20b of the injector condenser 20 are virtually identical, such that only one of the stages (for example the upper stage 20a) will be described in detail.

The stage 20a of the injector condenser, made in the form of a Laval nozzle, comprises two steam inlets (or first inlets) 24a and 24'a and a water inlet (or second inlet) 25. The steam inlets are placed laterally in two successive regions of the injector condenser, in the axial direction, that is to say in the direction of flow of the fluids in the injector condenser. The water inlet 25a communicates with an injection nozzle 25 mounted so that it can move in the axial direction of the apparatus, in either direction, and which can be displaced to regulate the position of the water injection point with respect to the neck of the injector condenser, by a remotely-controlled actuator 27. The water injection pipe 25 is fed with water from the storage tank 10, for example, at the recirculation system 16, by means of a water inlet 25a.

The second stage 20b of the injector condenser comprises two lateral steam inlets 24b and 24'b and a central water inlet (second inlet) consisting of a pipe communicating with the outlet of the first stage 20a.

At the outlet, the first stage supplies water at an intermediate pressure and temperature and the second stage is used to adjust these parameters to the conditions required of the injector condenser. The pressure and the flow rate of the steam introduced into the various steam inlets of the injector condenser 20 are regulated by a control valve and calibrated orifices associated with each of the steam inlets.

The method according to the invention may be implemented by using the injector condenser 20 fed via the steam pipe 5 with steam from the upper part 1a of at least one steam generator 1.

In the case of hot shutdown, this steam is at a temperature of 286° C. and at a pressure of 83 bar.

Secondary steam generator feedwater from the recirculation system 16 feeds the second inlet 25a of the upper stage 20a of the injector condenser. It is driven by the high-temperature and high-pressure steam which is mixed with the water from the recirculation system 16 of the tank 10 such that, at the outlet 26 of the injector condenser 20, water driven by the steam at a temperature substantially greater than the temperature of the water in the tank 10 is recovered. This temperature may, for example, be from 160° C. to 180° C.

The injector condenser 20 alone heats, pressurizes and injects feedwater into the secondary part of the steam generator. The water introduced into the inlet nozzle 18 of the steam generator is at a temperature greater than the temperature of injecting water by means of a device according to the prior art comprising the pump 17 of the APD system (or a fortiori an ASG system).

In this way, the thermal fatigue in the inlet nozzle 18 of the secondary part of the steam generator and the thermal stresses exerted on the shell surrounding the bundle and the internal components of the steam generators are reduced. The steam generator is fed passively by means of the injector condenser, that is to say without requiring an electrical supply for a motor driving a pump.

The water flowing through the nozzle 26 is driven by the steam which condenses, while being heated, such that, at the outlet 20c of the injector condenser, a stream of water driven by the dynamic effect of the steam and brought to a pressure greater than the inlet pressure of the water and of the steam in the injector condenser is recovered. The outlet water temperature is greater than the inlet water temperature of the injector condenser.

The injector condenser may in addition comprise, downstream of the neck 25 of the injector condenser pipe, a vent opening which may be connected to a vent pipe of the injector condenser, via an isolation valve and which is used for priming the apparatus on startup.

In order to implement the invention, it is possible to use an injector condenser with several stages, as shown in FIG. 2, in which a central stream of water is driven by a peripheral stream of steam or else an injector condenser of a different type comprising, for example, an annular water duct and a central steam injection pipe.

Figure 3:
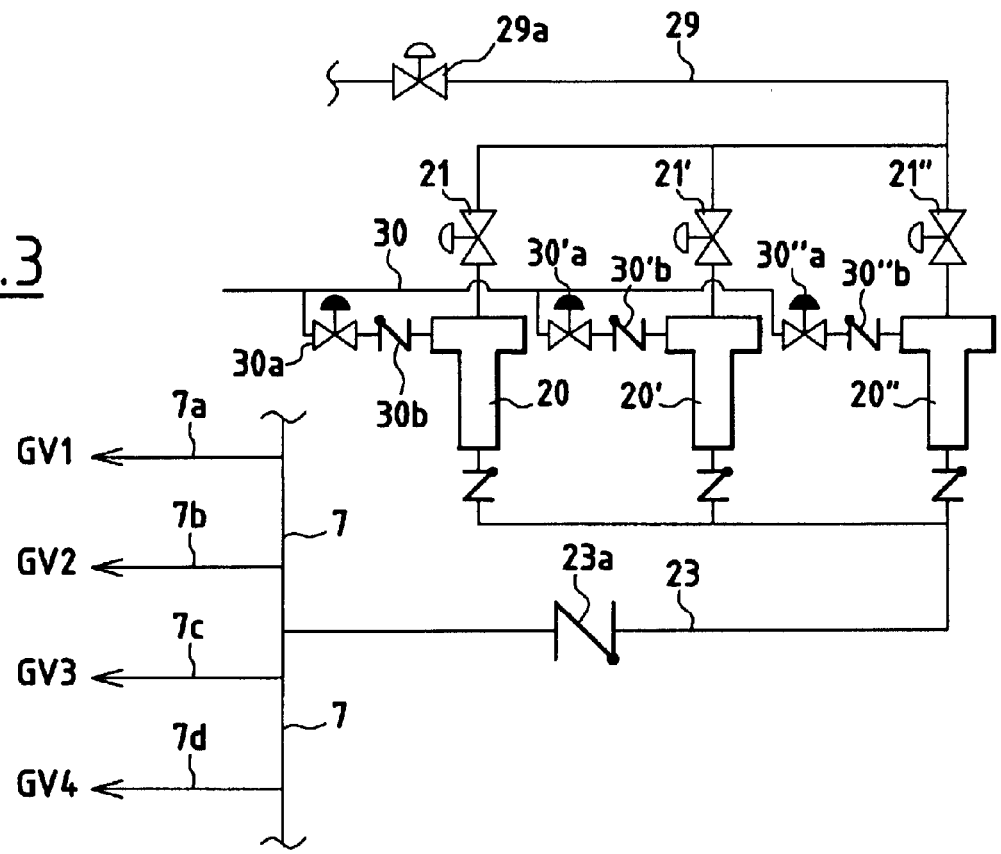
FIG. 3 is a diagram showing the parallel arrangement of three injector condensers used to implement the method of the invention.

FIG. 3 shows three injector condensers 20, 20', 20" which may be produced in the form as shown in FIG. 2 and which are used in order to cool the nuclear reactor coolant system between hot shutdown conditions and conditions for bringing the RRA system into service and to make up secondary feedwater when reheating the nuclear reactor coolant system, from conditions of bringing the RRA system out of service up to the temperature and pressure conditions of hot shutdown.

As will be explained below, in order to cool or heat the nuclear reactor between the hot shutdown conditions and the conditions for bringing the RRA system into service, it is possible to use several injector condensers and, for example, an injector condenser 20 that is able two produce a feedwater flow rate of 30 m$^3$/h and two injector condensers 20' and 20" in order for each one to produce a water flow rate of about 120 m$^3$/h.

As a result, it is possible to provide the steam generator of the pressurized-water nuclear reactor with a flow rate able to go from nearly 260 m$^3$/h to 25 m$^3$/h, given the operational sequence of the injector condensers and the regulation of the injectors.

The three injector condensers 20, 20' and 20" are placed in parallel and connected, by respective isolation valves 21, 21' and 21", to a steam feed line 29, itself connected to the steam pipe 5, upstream of the turbine 4 and of the steam bypass 13.

A valve 29a is placed on the line 29, making it possible to control the admission of steam into the feed line 29 common to the three injector condensers 20, 20' and 20".

The valves 21, 21' and 21" make it possible for the steam to be admitted at the first inlets of the injector condensers 20, 20', 20", respectively, when they are brought into operation.

The injector condensers are also fed, at their second inlet, with feedwater from the recirculation system 16 of the tank 10, by branches of the line 30 shown in FIG. 1, on each one of which an isolation valve 30a, 30'a or 30"a and a check valve 30b, 30'b or 30"b are placed, connected to each of the second inlets of the injector condensers 20, 20' and 20".

In this way, it is possible to put into service, by control of the stop valves such as 21, 21' and 21" and stop valves 30a of the branches supplying feedwater, one or more injector condensers, the outputs of which are connected to the pipe 23 for connecting the outlets of the injector condensers to the line 7 for feeding the steam generator 1, or more generally to feed lines for several steam generators of the nuclear reactor coolant system loops.

For example, as shown in FIG. 3, all three steam injectors 20, 20', 20" with two stages may be used to feed four steam generators, in the case of a nuclear reactor whose reactor coolant system comprises four loops, via four feed lines 7a, 7b, 7c, 7d each connected to the nozzle of a steam generator.

Similarly, the steam feeding the first inlets of the injector condensers may be withdrawn from one or more steam generators.

It is possible to regulate the feedwater flow rate of the steam generator within a very large range going, for example, from 25 m$^3$/h to 260 m$^3$/h, by bringing into service one or more injector condensers fed with steam withdrawn from the upper part of a steam generator by means of the steam pipe 5.

To implement the method according to the invention, depending on the type and the power of the pressurized-water nuclear reactor and depending on the cooling and heating functions to be provided, it is possible to use, for each of the steam generators, one or more injector condensers. Where it is necessary to use several injector condensers, these injector condensers are placed in parallel so that they can be brought into service independently of each other and these injector condensers generally have different characteristics, in particular with regard to the feedwater flow rates supplied.

As will be explained below, these injector condensers and their actuation means may be substituted by the APD system comprising a pump such as 17 for feeding the steam generator from the feedwater storage tank 10, as shown in FIG. 1A corresponding to the prior art.

FIG. 1B, which corresponds to the invention, shows an injector condenser 20, making it possible to implement the method according to the invention, and the reactor systems, so as to be able to describe comparatively the device according to the prior art and the device according to the invention.

Where injection condensers such as 20, 20' or 20" are used to feed the steam generator, the APD feed pump is not provided and is replaced by the injector condensers.

Conventionally, as shown in FIG. 1B, the steam generator 1 comprises a vent system 31 which is used in some phases of use of the injector condenser or injector condensers for implementing the method according to the invention, as will be explained below.

The steam systems of the generator shown in FIG. 1 comprise, conventionally, in addition to the steam bypass 13 to the condenser, a steam bypass 13' to the atmosphere.

The compression rate imposed on the injector condenser or injector condensers, that is to say the ratio of the water pressure at the injector condenser outlet to the steam pressure feeding the first injector condenser inlet, may be small, this compression rate being substantially equal to 1, taking the pressure drops in the injection line into account. This is because the feedwater must be injected into the secondary part 3 of the steam generator at a pressure substantially equal to the steam pressure in the upper part of the steam generator, the steam and the feedwater being substantially in pressure equilibrium.

As indicated above, an injector condenser has an operation of the volumetric type, such that the injection pressure, at the output, has no effect on the flow rate of the injector condenser.

Figure 4:
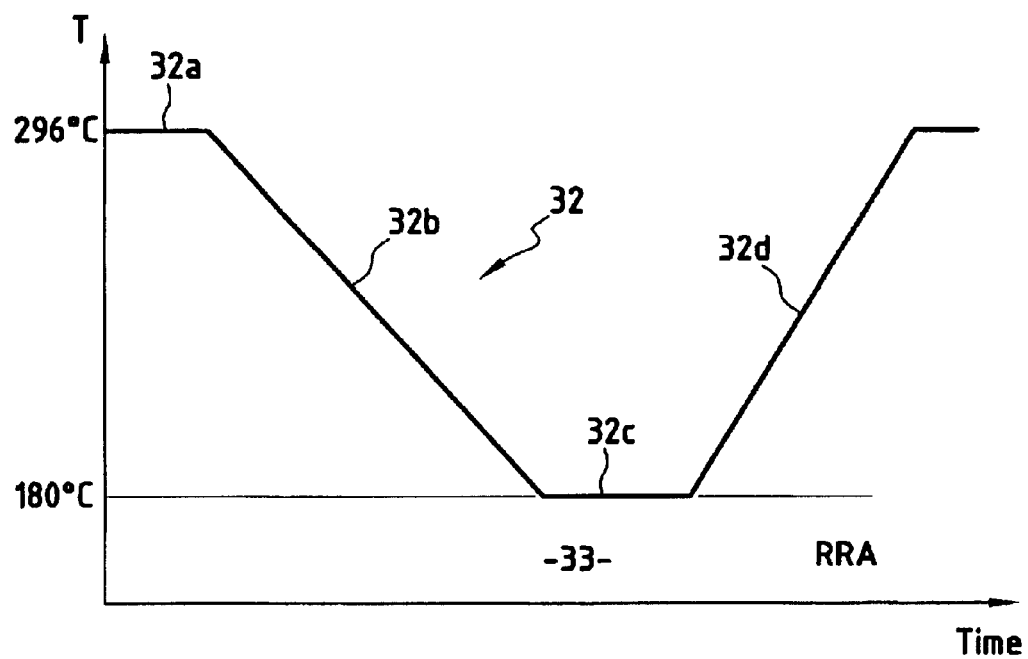
FIG. 4 is a graph showing the temperature of the reactor coolant system as a function of time, in the course of various operating phases of the nuclear reactor between the conditions of hot shutdown and those allowing a system for bringing the reactor to cold shutdown into service.

In FIG. 4, the change in temperature (and therefore in pressure) in the reactor coolant system comprising the primary part of at least one steam generator of a pressurized-water nuclear reactor, at the time of hot shutdown, is shown in the form of a graph of temperature against time during cooling between hot shutdown and the conditions for bringing the RRA system into service and during the heating of the reactor coolant system between the operating conditions of the RRA system and the hot shutdown conditions.

The curve 32, which represents the variations in temperature in the reactor coolant system of the nuclear reactor, comprises a stage 32a corresponding to hot shutdown at a temperature close to 296° C. The pressure in the reactor coolant system is then close to 83 bar. Following a hot shutdown, represented by the part 32a of the curve, it is possible for the reactor to be cooled between the hot shutdown conditions and the conditions for bringing the RRA cooling system of the shut down reactor into service, as shown by the part 32b of the curve 32 with a typical thermal gradient of 28° C./h.

After cooling down to the conditions for bringing the RRA system into service, the temperature in the reactor coolant system is close to 180° C.

It is possible to maintain the conditions allowing the cooling of the shut down reactor to be started, as shown by the part of the curve 32c, or to bring the RRA system into service, the temperature of the reactor coolant system then changing in the region 33.

Starting from the conditions of bringing the RRA system into service, it is possible to heat the reactor coolant system up to hot shutdown conditions, as shown by the part 32d of the curve 32.

The use of the method and of the device according to the invention to carry out cooling as shown by the curve 32b and reheating of the reactor coolant system as shown by the curve 32d and possibly for maintaining hot shutdown conditions or startup conditions of the cooling system, as shown by the parts of the curve 32a and 32c, will now be described.

During normal operation of the pressurized-water nuclear reactor, the APD system according to the invention replacing the APD system with a pump according to the prior art and comprising one or more injector condensers 20, for example three injector condensers 20, 20' and 20" as described above, is kept shut down. The injector condensers are not fed with steam or water and are isolated from the nuclear reactor systems by closure of the stop valves.

After shutdown of the nuclear reactor by dropping the control rods, in order to maintain hot shutdown, as shown by the part of the curve 32a, or cooling, as shown by the part of the curve 32b in FIG. 4, the system according to the invention comprising injector condensers is brought into service.

In order to do this, the valves such as 30a are opened, making it possible to feed the injector condenser or injector condensers with feedwater, the valves being located on the branches of the injector condensers which are being brought into service.

Valves such as 29a, 21, 21', 21" are also opened, allowing the first inlets of the injector condensers such as 20, 20' and 20" to be fed with steam, from the line 5 connected to the upper part of the steam generator.

According to need, one or more injector condensers are brought into service, as will be explained below, and the steam and water flow rates are regulated, so as to feed the steam generator with pressurized feedwater at a desired flow rate.

The means of finely adjusting the water flow rate provided by the injector condensers comprise control valves placed on the pipes connected to the injector condensers and the electric controls 27 for controlling the position of the water injection nozzle enabling the neck section of the steam injection nozzle in the injector condenser to be regulated. In this way, it is possible to control the feedwater steam flow rates.

Furthermore, the regulation means comprise the valve 22a placed on the line for returning feedwater to the tank 10, in the extension of the line 22 connected to the outlets of the injector condensers. The valve 22a makes it possible to send part of the flow rate supplied by the injector condensers into the tank 10 and therefore to control the flow rate supplied to the feed line 7 of the steam generator, via the connection pipe 23.

On bringing the injector condensers into service, a valve located on a vent pipe connected to the vent orifice at the neck of the water pipe of the injector condenser is opened, in order to prime the injector condenser.

Following a programmed shutdown of the nuclear reactor, in order to maintain hot shutdown or to cool down to the conditions for bringing the RRA system into service, it is necessary to supply the steam generator with a high water flow rate, since the water consumption is then maximum. The vent system of the steam generator may be in service during these periods.

The maximum feed capacity of the system according to the invention is then used. In the case of a feed system comprising the three injector condensers described above, these three injector condensers are brought into service, so as to supply the steam generator with a water flow rate of about 260 m$^3$/h at a pressure lower than or equal to 83 bar.

Because of the volumetric operation of the injector condenser, there is no need to envisage regulation according to the pressure of the secondary system.

The injector condensers fed with steam at 296° C. and with water from the feed tank at 130° C. then supply feedwater to the steam generator at a temperature which may be from 160° C. to 180° C. Thus, the thermal fatigue of the feed tap of the secondary part of the steam generator 1 and the stress of the internal components and of the shell of the steam generator are limited.

Heat from the reactor coolant system is removed by vaporizing the large flow of water of the secondary cooling system of the steam generator or generators, such that the temperature of the reactor coolant system decreases, as shown by the part of the curve 32b in FIG. 4.

During cooling, the flow rate of the injector condensers is controlled, so as to maintain the level in the steam generator. The steam flow rate is regulated depending on the temperature gradient that it is required to reach.

In particular, in the course of cooling, not all the injector condensers are kept in service, the required flow rate of steam generator feedwater no longer justifying, after a certain time, bringing into service all the injector condensers. For example, at the end of cooling, before bringing the cooling system of the shut down reactor into service, the required flow rate of feedwater is no more than 90 m$^3$/h, such that only a single injector condenser, with a maximum flow rate of 120 m$^3$/h, is kept in service.

During the phases of cooling the reactor coolant system, after hot shutdown, the steam bypass 13 or the system 13' is brought into service, the steam being sent back to the condenser which feeds the feedwater tank 10. Water to the condensers is made up by a condenser feedwater system shown as 34 in FIG. 1.

Water from the condenser is sent to the tank 10 for feeding the steam generator by means of the pump 15, called the CEX pump.

In order to start up the nuclear reactor, for example from conditions for bringing into service cooling for cold shutdown, and to raise the temperature of the reactor coolant system up to conditions relating to hot shutdown, as shown by the part of the curve 32d in FIG. 4, a single low flow rate injector condenser is brought into service, the only function of which is to maintain the level in the secondary part of the steam generator, in the case of water consumption, and for example, in the case described above, the injector condenser whose maximum flow rate is 30 m$^3$/h. This is because the reactor coolant system may have a small residual heat and the reactor coolant system is heated by the heat released from the reactor coolant made to circulate at high speed in the reactor coolant system by the primary pumps.

The water contained in the tank 10 is degassed in advance by a degasser fed with steam. Water made up in the tank 10 is made up from the condenser 12, using the pump 15. The temperature of the tank 10 can be maintained in particular by steam injections from the pipe 5 connected to the upper part of the steam generator or by the steam generated by an auxiliary electric heater (SVA).

The temperature of the reactor coolant system increases because the heat released by the reactor coolant is not completely removed by the low flow of secondary feedwater.

The tank 10 is kept at pressure by the steam, as indicated above.

The system according to the invention, using injector condensers, is installed in the turbine hall of the nuclear reactor. This system, because of its production and its functions, is not subject to particular safety and redundancy conditions.

Since the pressure of the feedwater must be as high as possible, the storage tank 10 is installed in the upper part, and the injector condensers in the lower part of the turbine hall of the nuclear reactor. The change in elevation is, for example, 20 m between the storage tank and the injector condensers.

The advantages of the method and of the device according to the invention resulting from the replacement of the APD pump according to the prior art by injector condensers are as follows:
- improved reliability of the injector condensers with respect to the pumps, because these injector condensers do not have any mobile parts and in particular any rotating parts requiring the use of bearings and of seals,
- lower installation and maintenance costs of the injector condensers with respect to a pump of a conventional APD system,
- easier installation of the APD system according to the invention, because of the small size of the injector condensers (typically with a length of 2 m and a diameter of 250 mm for one apparatus),
- reduction in the risk of thermal fatigue of the feed taps of the steam generator because the temperature of the injected water is higher than when using the APD system comprising a pump (for example 160° C. instead of 110° C.),
- operation of the injector condensers as volumetric generators, which avoids control valves capable of cavitating and of clogging up,
- possible operation of the APD system according to the invention, in the case of total loss of electrical supplies to the nuclear reactor, by means of certain arrangements making it possible to use the water resources of a nuclear reactor (or unit) twinned with the nuclear reactor on which the APD system according to the invention is used.

The invention is not limited to the embodiment which has been described.

In this way, it is possible to use one or more injector condensers having flow rates different from those which have been indicated above, depending on the power of the nuclear reactor and on the cooling or heating needs of the reactor coolant system.

The injector condensers may have one or more stages and may comprise one or more steam inlets. Generally, the injector condensers used within the scope of the method according to the invention comprise at least two steps, each comprising at least one steam inlet.

The reactor coolant systems of the pressurized-water nuclear reactors comprise at least two, and generally three or four, steam generators which can be simultaneously fed by a system according to the invention comprising injector condensers.

Generally, the invention is applicable to any pressurized-water nuclear reactor, in order to feed the steam generator or generators of the reactor, during transient phases between hot shutdown and cooling for cold shutdown.

What is claimed is:

1. A method for feeding at least one steam generator of a pressurized water nuclear reactor with secondary feedwater, said nuclear reactor comprising a reactor coolant system in which reactor coolant for cooling the core of the nuclear reactor flows and heats the feedwater in the steam generator, the method comprising:
   controlling said feeding of feedwater to make a temperature and a pressure of the coolant of the reactor vary during at least one of the following phases:
      a phase of cooling the reactor coolant from hot shutdown conditions to a temperature and a pressure permitting start-up of a residual heat cooling system, and
      a phase of reheating the reactor coolant from the temperature and the pressure permitting start-up of a residual heat cooling system to hot shutdown conditions;
   feeding said at least one steam generator with feedwater at a controlled flow rate through at least one injector condenser of a set of at least two injector condensers having different water flow rate supply characteristics arranged in parallel;
   feeding at least one first inlet of said injector condenser with steam withdrawn from an upper part of said steam generator;
   feeding a second inlet of said injector condenser with feedwater withdrawn from a storage tank fed with feedwater from a condenser which condenses steam produced by the steam generator;
   supplying feedwater at controlled pressure, temperature and flow rate to the steam generator through an outlet of the injector condenser while regulating said feeding of the first and second inlets with steam and feedwater, respectively; and controlling said flow rate of feedwater feeding said steam generator to vary the pressure and temperature of the coolant by bringing into service one or more injector condensers of the set of injector condensers during one of the phases.

2. The method according to claim 1, wherein said set of injector condensers comprises three injector condensers arranged in parallel and having different water flow rate supply characteristics.

3. The method according to claim 1 or claim 2 wherein, during the phase of cooling to a temperature permitting start up of a reactor residual heat cooling system, all the injector condensers of the set of injector condensers are brought into service.

* * * * *